(12) United States Patent
Rebholz et al.

(10) Patent No.: US 10,814,403 B2
(45) Date of Patent: Oct. 27, 2020

(54) TOOL ALIGNMENT DEVICE

(71) Applicant: GUEHRING KG, Albstadt (DE)

(72) Inventors: Felix Rebholz, Stetten-Frohnstetten (DE); Ingo Von Puttkamer, Messstetten (DE)

(73) Assignee: GUEHRING KG, Albstadt (DE)

( * ) Notice: Subject to any disclaimer, the term of this patent is extended or adjusted under 35 U.S.C. 154(b) by 0 days.

(21) Appl. No.: 16/403,866

(22) Filed: May 6, 2019

(65) Prior Publication Data

US 2020/0016666 A1 Jan. 16, 2020

Related U.S. Application Data

(63) Continuation of application No. PCT/EP2017/078204, filed on Nov. 3, 2017.

(30) Foreign Application Priority Data

Nov. 4, 2016 (DE) .................... 10 2016 121 134

(51) Int. Cl.
  *B23B 49/00* (2006.01)
  *B23B 25/06* (2006.01)
  (Continued)

(52) U.S. Cl.
  CPC ............ *B23B 49/005* (2013.01); *B23B 25/06* (2013.01); *B23B 49/00* (2013.01); *B23B 49/02* (2013.01);
  (Continued)

(58) Field of Classification Search
  CPC ....... B23B 49/00; B23B 49/005; B23B 49/02; B23B 25/06; B23Q 17/2233;
  (Continued)

(56) References Cited

U.S. PATENT DOCUMENTS 1,590,643 A * 6/1926 Neuwelt .............. B25H 1/0078
  408/112
2,360,942 A * 10/1944 Ellerstein ............. B25H 1/0078
  408/112

(Continued)

FOREIGN PATENT DOCUMENTS

DE     9200961 U1 *  4/1992  ............ B25C 1/047
DE    195 29 287 A1    2/1997

(Continued)

OTHER PUBLICATIONS

International Search Report and Written Opinion of the International Search Authority from a corresponding international patent application (PCT/EP2017/078204 dated Mar. 29, 2018, 19 pages.

(Continued)

*Primary Examiner* — Eric A. Gates
(74) *Attorney, Agent, or Firm* — Burr & Brown, PLLC

(57) ABSTRACT

A tool alignment device for mounting on a tool having a stop, especially on a drilling and/or countersinking tool having a single-piece tool shaft and a stop, for alignment of a drill hole and/or countersink to be introduced or for alignment of a finishing step in relation to a normal to the surface of a workpiece, comprising a main part and a through hole. Upon mechanical contact between the tool alignment device and the surface of the workpiece, a signaling device is actuated and emits alignment signal(s) during alignment in an alignment direction, and the stop of the tool can be accommodated in the main part, which comprises a guide device which establishes a connection between a stop sleeve of the stop and the tool alignment device such that the stop can be aligned in the alignment direction. Also, a drilling, milling and/or countersinking tool having a stop.

40 Claims, 7 Drawing Sheets

(51) Int. Cl.
*B25H 1/00* (2006.01)
*B23B 49/02* (2006.01)
*B23Q 17/22* (2006.01)

(52) U.S. Cl.
CPC ..... *B23Q 17/2233* (2013.01); *B23Q 17/2241* (2013.01); *B25H 1/0078* (2013.01); *B23B 2260/128* (2013.01); *B23C 2255/12* (2013.01); *Y10T 408/21* (2015.01); *Y10T 408/568* (2015.01); *Y10T 408/56245* (2015.01); *Y10T 408/8925* (2015.01); *Y10T 409/308624* (2015.01)

(58) Field of Classification Search
CPC ............. B23Q 17/2241; B25H 1/0078; Y10T 408/56245; Y10T 408/568; B23C 2255/12
See application file for complete search history.

(56) References Cited

U.S. PATENT DOCUMENTS

| | | | | |
|---|---|---|---|---|
| 2,483,060 | A * | 9/1949 | Niedelman | B25H 1/0078 408/112 |
| 2,710,549 | A | 6/1955 | Cogsdill | |
| 3,464,295 | A * | 9/1969 | Gallion | B25H 1/0078 408/112 |
| 3,572,181 | A * | 3/1971 | Schlegel | B23B 49/00 408/16 |
| 4,012,161 | A * | 3/1977 | Shultz | B23B 45/003 408/1 R |
| 7,607,871 | B1 | 10/2009 | Nelson | |
| 8,662,801 | B2 * | 3/2014 | Santamarina | B23B 49/005 408/110 |
| 9,669,473 | B2 * | 6/2017 | Ponton | B23B 49/02 |
| 9,789,577 | B2 * | 10/2017 | Kraft | B25H 1/0028 |
| 10,213,843 | B2 * | 2/2019 | Rebholz | B23B 49/005 |
| 2011/0222978 | A1 * | 9/2011 | Lange | B23B 49/02 408/115 R |
| 2013/0156519 | A1 * | 6/2013 | Martinez Quintero | B23B 49/00 408/1 R |
| 2019/0030624 | A1 * | 1/2019 | von Puttkamer | B23D 77/00 |
| 2019/0176248 | A1 * | 6/2019 | Rebholz | B23B 49/00 |

FOREIGN PATENT DOCUMENTS

| | | | | |
|---|---|---|---|---|
| DE | 19751209 A1 * | 5/1998 | | G01B 11/22 |
| DE | 101 54 434 B4 | 2/2007 | | |
| DE | 10 2013 100 130 A1 | 7/2014 | | |
| DE | 102013100130 A1 * | 7/2014 | | B23B 49/02 |
| DE | 20 2015 001 112 U1 | 5/2015 | | |
| DE | 102017104914 A1 * | 9/2018 | | B23B 51/107 |
| FR | 2679474 A1 * | 1/1993 | | B25H 1/0085 |

OTHER PUBLICATIONS

DPMAregister from a corresponding German patent application (DE 10 2016 121 134.6) printed on Oct. 9, 2019, 2 pages.

* cited by examiner

B-B

TOOL ALIGNMENT DEVICE

The present invention relates to a tool alignment device for arrangement on a tool comprising a stop.

The invention further relates to a drilling, milling and/or countersinking tool comprising a stop, comprising a tool alignment device according to the invention.

PRIOR ART

Stops for a drilling, milling or countersinking tools, which are identified as so-called "microstop" adapters, are known from the prior art. These adapters usually comprise a drill shank for accommodation in a chuck of a machine or of a hand-held turning tool, and a bearing, by means of which a stop sleeve can rotate freely about a drilling, milling or countersunk head, which is inserted into the adapter, so that, upon reaching a predetermined penetration depth into a component, the stop sleeve can attach to the surface of the component, and the drilling, milling or countersunk head can rotate freely. Such stops are used in particular for countersinking or milling operations in the vehicle and aircraft construction.

During use, the drill shank of such microstop adapters is accommodated into a chuck of a drilling tool, for example of a drilling machine, or of a milling tool. The stop sleeve can be provided with an axial adjusting thread, by means of which the longitudinal position of the stop sleeve can be adjusted relative to the tool head, and the stop depth can thus be set. The adapter has an accommodation, for example a screw thread, a bayonet closure or a quick clamping device for accommodating the drilling, milling or countersunk head, to store them centrically in the stop sleeve. Known microstop adapters thus comprise a drill shank, and the stop sleeve, which is supported so as to rotate freely, and the tool head can be exchanged as necessary. A stop adapter comprising a drill shank is thus provided, in which a machining tool head can be used for the rotating machining A stop device comprising a tool shank, which comprises a freely rotatable stop sleeve, which can be rotated about a tool shank of the stop device by means of a single pivot bearing, follows for example from DE 101 54 434 B4. A drilling or milling tool can be inserted into the tool shank of the stop device and can be locked in a rotationally fixed manner.

DE 20 2015 001 112 U1 shows a stop, which can be attached to drilling tools with a different diameter. For this purpose, the stop has two through bores, which are located opposite one another with respect to the circumference and into which a screw can be inserted in each case, so that the stop can be mounted to different drilling tool diameters.

A bore or countersink with a desired depth can be attained with the help of such stops. The desired alignment of the processing step with respect to the component surface can thereby only be ensured to a limited extent.

The problem results that the countersink or bore has the desired depth only in a certain circumferential region and cannot be made during the machining at a desired angle, usually at a right angle to the tool surface. In other subregions, the bore or countersink can be embodied to be less deep or deeper, because the machining tool cannot be aligned exactly to the surface of the workpiece by means of the stop.

Further alignment devices or adjusting devices, respectively, are known from the prior art, which can be used as drilling template or drilling aid, and which can be attached directly to a tool shank, in order to set the desired alignment of a turning tool. The known alignment devices or adjusting devices, respectively, are thereby each directly connected to the tool shank, so that an inner surface of the alignment device or adjusting device, respectively, is at least partially in contact with the surface of the tool shank.

For instance, DE 10 2013 100 130 A1 shows a device comprising a tripod comprising a support control for machining by a tool. The support control takes place by means of one or a plurality of measuring sensors, which reproduces or reproduce, respectively, the measured values of the support or non-support of bases of the tripod. An acoustical or visual signal serves as display for a measurement result.

In particular in the vehicle, ship and aircraft construction, an exact alignment of turning operation processes and a defined penetration depth of the turning tool due to a flawless and streamlined design of a workpiece surface are of great importance. No tool, which simultaneously provides for a defined alignment on a workpiece surface, such as a defined penetration of the tool into the workpiece up to a predeterminable depth, is known from the prior art for this purpose.

It is thus the object of the invention to propose a device, which can align a drilling, milling and/or countersinking tool, and which simultaneously ensures a desired drilling, milling and/or countersink depth.

The above-mentioned object is solved by means of a tool alignment device for a drilling, milling and/or countersinking tool according to the invention comprising a stop according to the independent claim, as well as by means of a drilling, milling and/or countersinking tool comprising a stop and alignment device. Advantageous embodiments are the subject matter of the subclaims.

DISCLOSURE OF THE INVENTION

A tool alignment device for arrangement on a tool comprising a stop, in particular a drilling and/or countersinking tool comprising a single-piece tool shank and a stop, for aligning a bore and/or countersink to be introduced or for aligning a finishing step in relation to a normal to the surface of a workpiece, comprising a main part and a through hole, is the subject matter of the invention.

It is proposed that at least one signaling device is comprised, which is actuated upon mechanical contact of the tool alignment device with the surface of the workpiece and outputs at least one alignment signal during alignment in an alignment direction, and that the stop of the tool can be accommodated in the main part, wherein the main part comprises a guide device, which establishes a connection between a stop sleeve of the stop and the tool alignment device, so that the stop can be aligned in the alignment direction.

In other words, an alignment device or adjusting device, respectively, as drilling, milling and/or countersinking aid is proposed, which actuates a signaling device by means of mechanical contact with the surface of a workpiece, whereby it is specified that the tool is located in the desired machining position, i.e. alignment device. The alignment device can routinely be a 90° angle to the workpiece surface, but can also be an angle of inclination and inclination direction, which can be selected freely, in relation to the workpiece surface. For this purpose, the tool alignment device is attached to a tool comprising a stop. For this purpose, the stop of the tool is accommodated and supported in the main part of the tool alignment device, and the tool, along with the stop, is thus retained in the tool alignment device. A drilling, milling, countersinking tool or a combined drilling-countersinking tool comprising a stop can thus be aligned. It is possible thereby to ensure a precise penetration depth by means of the stop on the one hand, which is important in particular in the case of countersinks, and to maintain a defined machining angle on the other hand. The tool alignment device can advantageously be embodied as tripod, into which the stop can be accommodated.

The predeterminable setting of an operating position preferably in an orthogonal direction to a tangent on a surface of a workpiece, i.e. in the direction of a normal to the workpiece surface is possible by means of such an alignment device. This also allows for the defined alignment of the drilling, milling and/or countersinking tool on flat and curved surfaces. For example a combined drilling-countersinking tool, to which a stop is attached, can thereby be accommodated in the tool alignment device. In the case of a combined drilling with subsequent countersinking, the drilling depth can be determined by the geometry of the tool, the countersink depth by the position of the stop, and the alignment of the tool by the tool alignment device.

With respect to the axis of rotation, the main part of the tool alignment device is preferably embodied with a larger longitudinal dimension than the stop. The tool alignment device can thereby have at least twice the length of the stop, preferably at least three times the length of the stop with respect to the axis of rotation. In the circumference, the stop can be enclosed completely by the main part. The main part preferably has a partially circular or circular shape, at least across a part of the length. A partially circular shape has the advantage that the complete tool alignment device can be guided close to a wall, which runs parallel to the axis of rotation of the tool, with one side. A bore or countersink can thus be introduced into a workpiece close to such a vertical wall, or can be attached to the wall, in order to determine a defined alignment direction.

The guide device serves the purpose of permitting or preventing a relative movement between an installed stop and the tool alignment device. A rotational relative movement between stop and the tool alignment device is preferably prevented by means of the guide device, and an axial longitudinal displacement is permitted. The guide device is preferably attached along a limited circumferential region on the inner surface of the main part of the tool alignment device. The guide device can thereby also be partially integrated in the main part. The guidance preferably occurs mechanically. It is also conceivable that a stop is also part of the tool alignment device and/or is adapted to the geometry of the tool alignment device. For a use, a clamping tool can thus be inserted into and attached to the stop, which is part of the alignment device.

The alignment of a tool comprising an attached stop can take place by means of such an alignment device, wherein the alignment device is in contact with the stop, and the stop is in contact with the tool. Two contact regions, which are separated from one another, are created thereby. One contact region is formed by the contact between the surface of the tool and at least a part of the inner surface of the stop. A further contact region is created between the outer surface of the stop and the inner surface of the main part of the alignment device. These two contact regions can thereby be designed so as to be separated from one another and thus so as to be different. The tool, the stop, and the alignment device can thus each be embodied so as to be rotatable or longitudinally displaceable relative to one another. The tool, the stop, and the alignment device can likewise each be supported in a rotationally fixed manner relative to one another and/or so as to be displaceable in a longitudinal direction. This can be ensured by means of the guide device in the contact region between alignment device and stop. At least in some sections on the surface, the stop thus comprises a further, specially embodied region, which forms the guide device. At least one further, in particular mechanical device, is thus required so as to now connect the alignment device to a stop, and thus to a tool comprising a stop. This becomes clear in particular in that the guide device preferably prevents a rotational relative movement between stop and alignment device, and permits an axial longitudinal displacement relative between stop and alignment device. The stop, which is provided for the introduction into such an alignment device, is a stop, which, with respect to the prior art, is further developed with a region, which can guide the guide device. Stops known from the prior art usually do not have any further elements or specially embodied regions on the outer surface, in particular not for the connection to a further element, such as an alignment device or the like. Without a further type of guide device, which can be connected to the guide device of the alignment device, the stops known from the prior art are not suitable for connection to such an alignment device. The guide device of the stop thereby corresponds to the guide device of the alignment device, so that a coupling between stop and alignment device can be ensured. With only a smooth embodiment of the surface of the stop, a guidance of the stop in the alignment device is not possible with the help of the guide device.

In a preferred embodiment, the stop can be capable of being connected to the tool alignment device in a rotationally fixed manner. A rotationally fixed connection can take place via the guide device, wherein, during operation of an installed tool comprising a stop, the stop as well as the tool alignment device does not undergo a rotation, i.e. is rotationally fixed. An intact surface on the workpiece surface can thereby be maintained and attained in the region of the bore and/or countersink, because no tangential relative movement can result between stop and workpiece surface.

In a preferred embodiment, the stop can be guided in a longitudinally displaceable manner in the tool alignment device, can in particular be guided through the guide device, wherein the stop can be displaced in the main part in a longitudinally axial manner in the direction of the workpiece. In relation to the longitudinal axis of the tool alignment device, the stop preferably has a smaller length than the main part of the tool alignment device. In the alternative, a stop can also be pulled out beyond an upper front face of the alignment device, so that a smaller overall height of the alignment device can be attained. The installed stop can thus be displaced in the axial longitudinal direction within the main part. The stop can be displaced at least so far in the longitudinal direction that the lower edge of the stop and the lower edge of the tool alignment device lie at the same height. In a lowered position of the stop, said stop and the lower edge of the tool alignment device are in contact with the surface of the workpiece. The depth of the bore and/or countersink to be introduced can be determined via the stop, while the tool alignment device determines the alignment of the bore and/or countersink and holds it in a desired position.

In a preferred embodiment, the guide device can comprise a pin, a web and/or a groove, wherein the web and/or the groove preferably run in the longitudinal direction, preferably parallel to the longitudinal axis of the tool alignment device, and can accordingly be guided in a longitudinally axial manner in a groove or in a pin or web of the stop sleeve, so that a rotationally fixed connection between the tool alignment device and the stop, and an axial displaceability of the stop is provided in the tool alignment device. The pin or the web in the groove is thereby guided in such a manner that the stop can be connected to the tool alignment device in a rotationally fixed manner. The groove can be arranged along an inner surface of the main part of the tool alignment device or in the outer surface of the stop. The pin or the web, respectively, can accordingly likewise be attached to the stop or to the main part, so that for a guide device, at least one pin or web, respectively, can in each case engage with at least one groove arranged on the respective other element. The width of the groove thereby corresponds approximately to the width of the pin or of the web, respectively, so that a rotationally fixed support is made possible. In a preferred embodiment, the guide device can comprise at least two, preferably three such web-groove or pin-groove connections, respectively, in the circumferential direction of the tool alignment device.

In a preferred embodiment, the web or the groove can run across the complete axial length of the tool alignment device or of the stop, so that the stop can be displaced in such a way that an underside of the stop can come into mechanical contact with the surface of the workpiece. With respect to the longitudinal axis, the tool alignment device is preferably embodied so as to be longer than the stop, so that the web or the groove can preferably run across the complete length of the tool alignment device. It is thus ensured that the stop can be displaced all the way to the lower edge of the tool alignment device or also beyond it, and can come into contact with a workpiece, in order to determine the countersink or bore depth, respectively. The groove or the web, respectively, can run linearly parallel to the longitudinal axis of the tool alignment device or also in a curved or angled manner, respectively. The groove or the web, respectively, can thereby also form a spiral shape along the inner surface of the main part of the tool alignment device, in order to perform a forced rotational movement in response to the lowering, for example in order to accommodate or to surround parts protruding from the workpiece surface.

In a preferred embodiment, the tool alignment device can comprise at least two, preferably at least three, mechanical or electrical sensing elements for bearing on the surface of the workpiece, wherein the sensing elements are preferably arranged so as to be distributed evenly circumferentially on the workpiece-side front side of the main part. In the case of an embodiment comprising three sensing elements, the tool alignment device can be embodied as a type of tripod. With the embodiment of separate sensing elements instead of a large-area bearing surface, the region around the point to be machined on the surface of a workpiece can remain free, whereby chips or coolants can be discharged better. A transmission of the data to a computer can further be provided, which serves for the quality control. With the actuation of the signaling device via mechanical contact of the sensing elements with a surface, no use of measuring sensors or other distance measuring devices is required. An alignment device, which is cost-efficient and which can be produced in a simple manner, can thus be provided, which can be used without electrical energy. If the bore or countersink is to only be balanced in one direction, the tool alignment device can be embodied with only two sensing elements. For the alignment in two spatial directions, the embodiment with three or more sensing elements is advantageous. The third spatial direction, i.e. the height, in which the tool is attached, is determined by the clear machining height above the surface of the workpiece and the depth of the machining section. More than three sensing elements can likewise be used. By means of a longitudinal change of the sensing elements or adjustment of the contact point of the sensing elements, i.e. the relative switching position, in the case of which an electrical switch is closed when attaching the sensing elements and moving the sensing elements into the main part, angular deviations from the normal and thus specified oblique angles can also be set for the machining.

In a preferred embodiment, the axial sensing position of the sensing elements can be adjustable for setting the alignment device. It is thus possible to not only align countersinks and/or bores orthogonally to a workpiece surface, but also at a desired angle of not equal to 90°. In that at least one sensing element has a changed length with respect to the remaining sensing elements, the alignment can take place at any angles in relation to the workpiece surface. An orthogonal alignment of the bore and/or countersink in relation to the vertical can further take place on an oblique workpiece surface.

In a preferred embodiment, all sensing elements can close an electric circuit between an electrical current source comprised in the main part and the signaling device by means of a series connection actuated by the sensing elements by means of an alignment movement of the tool alignment device in relation to the normal of the surface of the workpiece, so as to actuate the individual signaling device by means of the closed electric circuit. By means of the mechanical contact of the sensing elements with the surface of a workpiece or another surface, an electric circuit is closed by means of series connection, whereby a signaling device is actuated only upon the contacting of all sensing elements and outputs an alignment signal. In the case of the embodiment of the alignment device with three sensing devices, an orthogonal alignment of the alignment device and thus of the tool can be determined. An electrically simple electric circuit without electronic auxiliary elements can be used.

In a preferred embodiment, an electrical switching point of at least one electrical sensing element can be capable of being positionally adjusted in the bearing direction towards the surface of the workpiece, in particular being capable of being screwed or displaced relative to the surface of the workpiece by means of a contact adjusting screw, so that the alignment device can be set in relation to the normal of a surface of a workpiece. The switching point, i.e. the relative position of sensing element to the main part, at which an electrical contact is triggered by the respective sensing element, can be set thereby. It is thus very simple to set an alignment to the normal of the workpiece surface. If the switching point is set identically for each sensing element, an alignment along the normal is attained. If the switching points are set differently, a respective angularly and directionally settable deviation to the normal results, so that oblique machining in relation to the workpiece surface can also be set. It is thus not necessary to exert a high pressure on the surface of the workpiece by means of the alignment device, in order to ensure that the device bears on completely. The switching point can be set in such a sensitive way by means of the contact adjusting screw that the signaling device is already actuated upon slight contact of the alignment device with the surface of the workpiece. For this purpose, the contact adjusting screw can preferably be displaced and set in a direction parallel to the direction of the inserted tool shank.

In a preferred embodiment, at least one spring contact sheet, which can be mechanically contacted by means of at least one electrical sensing element, can be capable of being electrically contacted via the contact adjusting screw with a screw contact sheet, wherein the contact adjusting screw can preferably be accessed and set from the top side of the main part and is arranged in the main part in the alignment direction, or at least two contact adjusting screws can be capable of being electrically connected via a joint spring contact sheet, and at least two contact adjusting screws can be electrically connected to one another via a screw contact sheet. The spring contact sheet can deform in such a way that no contact is present between spring contact sheet and contact adjusting screw in the initial state, while the displacement of the sensing devices can create a deformation of the spring contact sheet when the tool alignment device bears against a surface and upon contact of the sensing devices with the surface, so that a contact is established between spring contact sheet and contact adjusting screw. The relative distance of the contact adjusting screw from the spring element determines the position of the switching point. By means of an axial adjustment of the contact adjusting screw, either by means of screw or axial displacement movement, the switching point can be set highly accurately and the machining direction can thus be set. Here, the initial state describes the state prior to the attachment of the tool alignment device on a surface. Due to the fact that the contact adjusting screw can be accessed and set from the top side of the main part, a setting of the machining direction can already be performed when the sensing elements of the tool alignment device bear and press against the workpiece surface by adjusting the axial position of the contact adjusting screws, without having to remove the tool alignment device from the workpiece for an adjustment. By means of the electrical connection between at least two contact adjusting screws, an electrical series connection of the individual contact points, at which the sensing elements establish a mechanical contact, can be attained very easily by means of a minimal number of components, whereby a closed electric circuit is attained.

In a preferred embodiment, the at least one spring contact sheet can be arranged parallel to the at least one screw contact sheet in the main part, wherein the screw contact sheet can be electrically contacted with the spring contact sheet via at least one contact adjusting screw by means of a spring movement, which is triggered by the sensing element. Based on a workpiece surface, spring contact sheet and screw contact sheet can thus be arranged in parallel and on top of one another, wherein the contact adjusting screw is aligned axially in the direction of the workpiece surface, and sets the switching point. A current flow is achieved via the screw contact sheet, the contact adjusting screw, and when bending the spring contact sheet by means of the sensing element when touching the spring contact sheet with the contact adjusting screw. A mechanically simple and robust setup is thus attained. The spring contact sheet and the screw contact sheet can be embodied differently or structurally identical. They can likewise be made of the same material. A plurality of spring contact sheets and a plurality of screw contact sheets can also be present, wherein they can likewise be embodied structurally identically. The course of the current flow within the tool alignment device is preferably determined via the geometry of the spring contact sheets and screw contact sheets.

In a preferred embodiment, an electrical current source and/or the signaling device can be in electrical contact with at least one spring contact sheet and/or at least one screw contact sheet. The signaling device can further be connected to a contact of the current source. A series circuit is proposed, comprising a minimal electrical line guide and a robust and simple setup comprising a minimal number of electrical connections. An alignment signal can thus be actuated only by means of a mechanical contact of all sensing elements with the surface of the workpiece, whereby an electric circuit is closed via the at least one spring contact sheet and/or at least one screw contact sheet.

In a preferred embodiment, the at least one screw contact sheet can have bores, into which the contact adjusting screw can be inserted, soldered or screwed, whereby a permanently-guiding connection is established between the screw contact sheet and the contact adjusting screw. The regions, in which a mechanical contact can be established between the spring contact sheet and the respective contact adjusting screw by means of a movement of the sensing elements, thereby represent the only regions, which can effect an interruption or a completion of the electric circuit. Due to the fact that the screw contact sheets are firmly connected to the contact adjusting screws in an electrically conductive manner, the movable points in the tool alignment device are minimized and the electrical robustness is increased, whereby the functionality is optimized.

In a preferred embodiment, at least one contact adjusting screw can be positionally secured via a locking screw. The sensibility of the contact point can be set with a high accuracy thereby and an unintentional adjusting of the alignment setting can be prevented. If all contact adjusting screws, preferably all three contact adjusting screws, are each secured by means of a locking screw, the position in relation to a normal to the surface of a workpiece can be set with a high accuracy. The locking screw can attach radially to the contact adjusting screw, in order to prevent a position change. The locking screw can be accessible from the outer circumference of the main part, and can be detached by means of the contact adjusting screw prior to a change of the alignment. The introduction of bores or countersinks with a low error tolerance in relation to the alignment direction can be attained thereby.

In a preferred embodiment, the at least two sensing elements, preferably at least three sensing elements, can have the same length L. The number of the identical elements is increased thereby and an alignment along the normal of a workpiece surface is simplified. An optimal alignment of the bore or of the countersink in a workpiece can be attained thereby. The main part can further be embodied circular cylindrically or partially circular cylindrically. Due to different geometries of the cross section of the main part, the minimal distance of the sensing elements to the edge of the main part can be specified. The minimal distance to a boundary wall or to a further workpiece element, which is arranged at an angle to the surface, to which the tool alignment device is to be attached with the sensing elements, is also determined thereby. The distance of a bore, countersink or the like to a boundary wall of the workpiece is thus also minimized thereby, because the main part comes into contact with the boundary wall at a minimal distance. To be able to introduce a bore or rotational machining in an aligned manner as close as possible to such a limitation, the main part can be flattened on one side or can be designed with a special cross sectional geometry, in order to provide an alignment in a manner which is complementary in shape to the surface geometry of the workpiece. The geometry of the main part can likewise serve for the alignment of the bore or countersink, when the main part comes into contact with a boundary wall or a further workpiece element on one or on a plurality of sides. An adaptation of the main part geometry is advantageous in particular in the case of complex workpiece geometries. The signaling device can furthermore be arranged on the top side of the main part and can be embodied as optical, haptic and/or as acoustic signal generator, preferably as LED signal generator. From this side, the signaling device is optimally visible for an operator during the operation of the tool. The signaling device can likewise be attached to the main part on a lateral position or can be transferred to an operating position via a connecting cable or wirelessly, if the tool alignment device is not accessible to an operator during the operation. It is thus conceivable to transfer an acoustic or optical signal to an operator via an electrical connecting line, even under difficult acoustic or optical conditions.

The front side of the sensing elements to be attached to the workpiece surface can preferably have a ball or rolling bearing, so that the alignment device can be displaced on the workpiece surface and so that a predefinable machining angle can be maintained thereby. A partial milling of recesses by means of a displaceable alignment device can advantageously be facilitated in particular in the case of milling tools.

A drilling, milling and/or countersinking tool or a clamping tool combined of them, respectively, comprising a stop is also the subject matter of the invention. It is proposed that the stop is accommodated in a tool alignment device according to one of the preceding claims. The drilling, milling and/or countersinking tool thereby corresponds to a combination of a tool alignment device as already described, comprising a machining tool comprising a stop, wherein the machining tool comprising a stop is accommodated in the main part of the tool alignment device. The main part comprises a guide device, which establishes a connection between the stop sleeve of the stop and the tool alignment device, so that the stop can be aligned in the alignment direction. The stop is thereby preferably supported in a longitudinally displaceable and/or rotationally fixed manner in the main part. On the outer surface, the stop thus likewise has a type of guide device, which corresponds to the guide device of the alignment device. The further embodiments of the tool alignment device according to the invention can likewise be transferred to the drilling, milling and/or countersinking tool.

In a preferred embodiment, the stop can be clamped, screwed or adhered to the tool shank of the tool, in particular of a deburring tool. The stop can thereby comprise a stop sleeve, which is coupled to the sliding or rolling bearing so as to be freely rotatable about the tool, wherein a first bearing bush of the bearing supports the stop sleeve, and a second bearing bush of the bearing sits on a shank sleeve in a rotationally fixed manner, wherein the shank sleeve can be slid onto a thread-free shank of the tool and can be attached in an adhesive or thermally pressable manner, and the shank of the tool can be clamped directly into a chuck of a turning machine or drilling machine. The shank sleeve can advantageously be adhered, pressed or clamped directly onto the thread-free tool shank. A conventional machining tool can thus be retrofitted with the stop. For example, the shank sleeve can thus be adhered to the shank by means of an adhesive, in particular a metal adhesive, in particular by means of a two-component metal adhesive, such as a 2K epoxy resin adhesive or 2K acrylate adhesive. Any setting position of the shank sleeve on the tool shank can thereby be set very easily and the adhesive can be cured, wherein a simple and cost-efficient attachment of the stop to a tool can be attained. An attachment by means of thermal shrink fitting is also conceivable, wherein a heated, widened shank sleeve is applied to a tool shank and is cooled down at a desired position, in order to provide a non-positive connection. The shank sleeve can ultimately also be attached to the tool shank by means of a clamping connection, for example by means of a clamping widening or a gripper clamp, clamping screw or the like. The shank sleeve supports the inner bearing bushes of the stop sleeve. The stop depth is defined by means of the axial position of the shank sleeve on the tool shank as well as the position of the stop sleeve in relation to the outer bearing bushes.

In other words, the stop can be slid onto and can be attached directly to a shank of a single-piece drilling, milling and/or countersinking tool. The shank sleeve couples the stop sleeve via a pivot bearing to the took shank of a rotational tool, which can be inserted into the shank sleeve. The tool shank is advantageously embodied in a thread-free manner, i.e. it is embodied to be smooth and without threaded section. This does not lead to a radial thickening of the tool shank in relation to the nominal shank diameter. The shank sleeve can be attached at an axial position of the tool shank in a rotationally fixed manner. The position of the shank sleeve on the tool shank and the position of the stop sleeve on the bearing bush define the penetration depth of the tool, up to which the stop sleeve attaches on a surface of a workpiece to be machined. If a penetration depth, which is specified thereby, is reached, a front-side stop ring of the stop sleeve sits on the tool surface, while the tool rotates freely with the shank sleeve in the interior, and the stop sleeve can rest on the component surface due to the sliding or rolling bearing coupling with the adjusting ring.

The stop can thus be slid onto and attached to the tool shank of any drilling, milling and/or countersinking tool, and can be set for specifying a penetration depth of the tool to a component. The shank of the tool can be clamped directly into a chuck of a turning machine or a drilling machine, so that an optimal concentricity is ensured. The machining step can additionally be optimally aligned by means of the tool alignment device. The attachment angle of the tool can be optimally selected, wherein the stop sleeve does not form an indirect connection between tool head and driving drilling tool, but only attaches to the drill shank of the tool. The depth stop is defined by the position of the shank sleeve on the drill shank as well as the relative axial position of the freely rotatable stop sleeve to the shank sleeve.

DRAWINGS

Further advantages follow from the present description of the drawings. Exemplary embodiments of the invention are illustrated in the drawings. The drawings, the description, and the claims include numerous features in combination. The person of skill in the art will advantageously also consider the features individually and will combine them to expedient further combinations.

Identical or similar components are numbered with identical reference numerals in the figures.

Figure 1A:
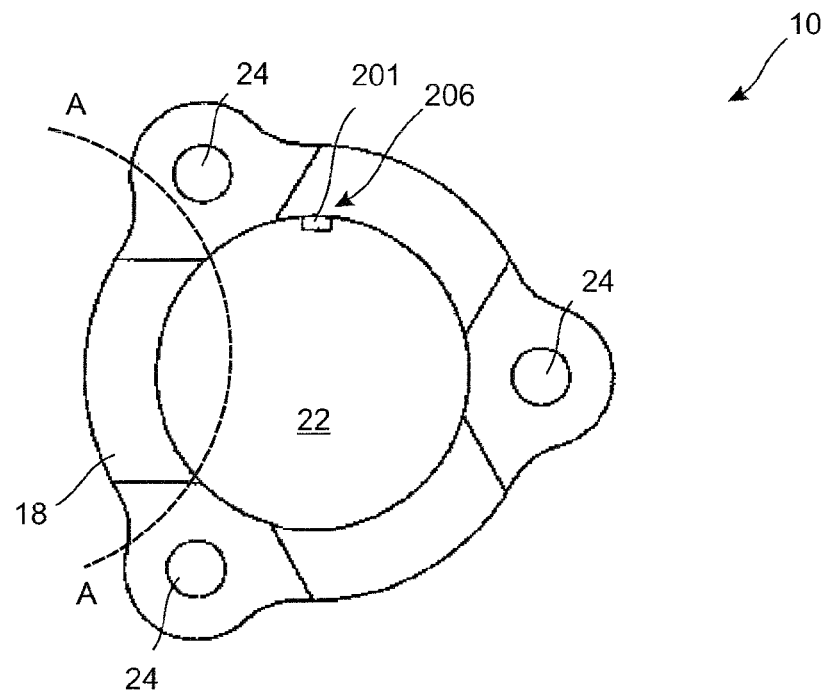
FIG. 1 shows an embodiment of a tool alignment device according to the invention.

FIG. 1 shows an embodiment of a tool alignment device 10 according to the invention. The bottom view in FIG. 1a shows the underside of the tool alignment device 10 facing a workpiece surface. Three sensing elements 24 and a through hole 22 are visible thereby. The three sensing element 24 are arranged so as to be evenly distributed in the circumferential direction of the main part 18, in order to remain stable and to attain an exact alignment on a plane. A guide device 206 in the form of a longitudinally axially aligned web 201 is attached to the inner side of the main part 18. The through hole 22 serves to accommodate a clamping tool comprising a stop and has an inner diameter, which corresponds to an outer diameter of a stop.

Figure 1B:
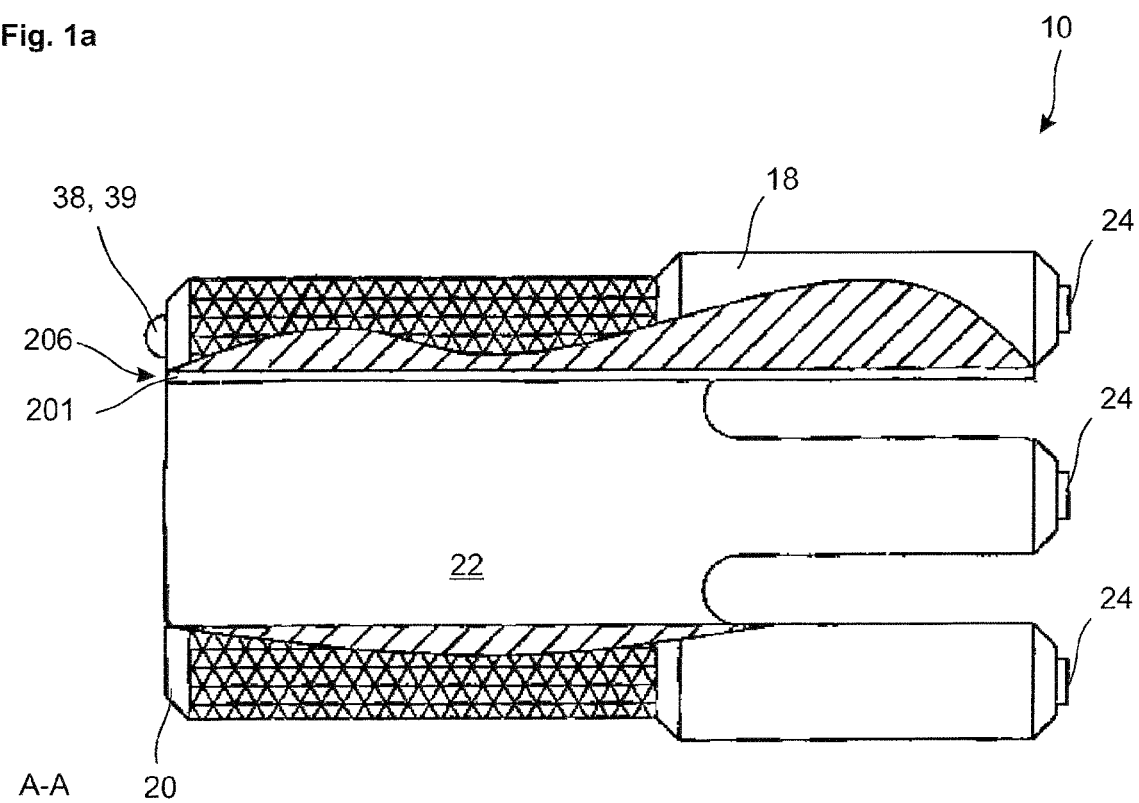

FIG. 1b shows a longitudinal section of the embodiment along the sectional line A-A of FIG. 1a. On the underside, the three sensing elements 24 protrude beyond the main part 18. The sensing elements 24 each run in a separate elongate section of the main part, wherein the main part does not have a cohesive cross section in this region, but forms a type of tripod. A web 201 is attached along the inner surface of the main part 18. Said web is embodied across the complete length of the main part 18. In the case of an embodiment comprising a pin, the latter would only be embodied across a short section with relation to the length of the main part 18 on the inner side of the main part 18. A cover 20 as well as a signaling device in the form of an LED signal generator 39 is attached to the top side of the main part 18. An embodiment comprising more than one signal generator is likewise conceivable. The LED signal generator 39 is actuated as soon as all three sensing elements 24 are in contact with the workpiece surface and thus indicates an alignment. The axial position or a protrusion, respectively, of the sensing elements 24 beyond the underside of the main part 18 can be set in order to provide for an angled alignment from the normal of the workpiece surface.

Figure 2A:
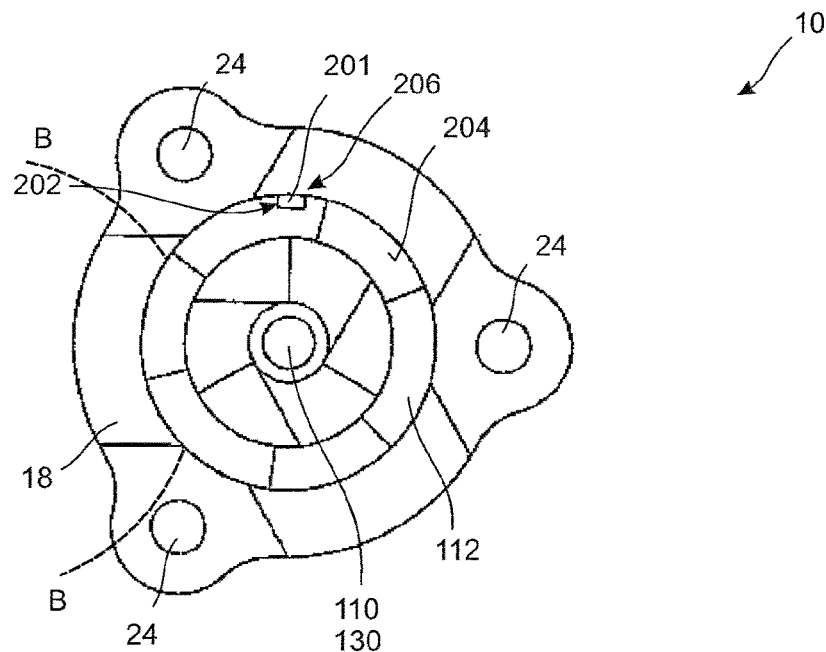
FIG. 2 shows an embodiment of a tool alignment device according to the invention comprising a tool.
Figure 2B:
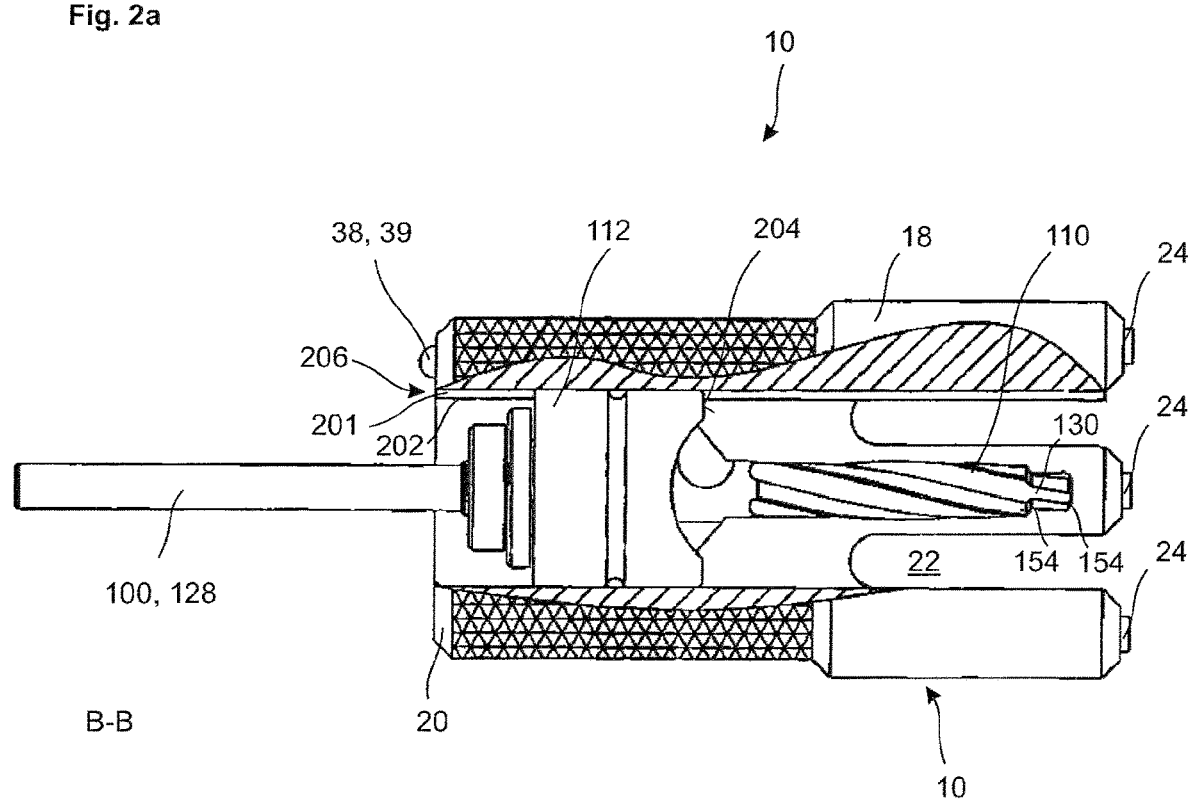

The illustration in FIG. 2a and FIG. 2b shows the tool alignment device 10 with installed stop 112 and tool 110. The stop 112 is introduced into the interior of the main part 18 and is supported in a rotationally fixed and axially displaceable manner via a guide device 206. For this purpose, the stop 112 has a groove 202, with which the web 201 engages. The one contact region between the inner surface of the main part 18 and the outer surface of the stop 112 is visible thereby. The further contact region between the inner surface of the stop 112 as well as the outer surface of the tool 110 is not visible in this view.

The view in FIG. 2a shows the underside of the tool alignment device 10, wherein the tool head 130 is visible in this view.

The longitudinal section in FIG. 2b along the partial sectional lines B-B shows that the stop 112 is not embodied across the complete length of the main part 18. The stop 112 can be displaced in the axial longitudinal direction within the main part 18, until the underside 204 of the stop 112 lies in a plane with the underside of the main part 18 or the sensing elements 24, respectively. On the opposite side of the main part 18, the tool shank 128 protrudes beyond the tool alignment device 10. In the further embodiments, the tool alignment device 10 corresponds to the tool alignment device from FIG. 1.

Figure 3:
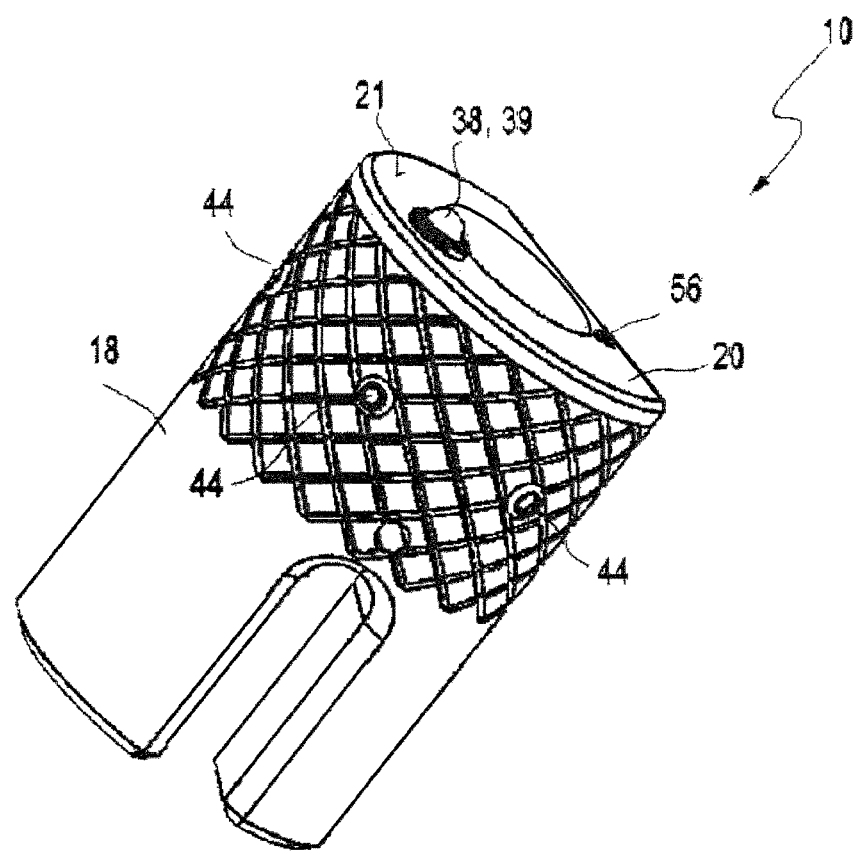
FIG. 3 shows an outer view of an embodiment of a tool alignment device according to the invention.

FIG. 3 shows a three-dimensional illustration of a further embodiment of a tool alignment device 10. In the outer view, the main part 18, the cover 20 of the main part 18, the signaling device 38, the locking screws 44, as well as a guide sleeve 48 for use of a tool shank (not illustrated) are visible. The main part 18 has a partially circular cross section, wherein a flattening is embodied on one side. The tool alignment device 10 can thus also be used in corner regions or edge regions, respectively, of a workpiece comprising an adjoining wall of step, wherein regions close to the adjoining wall can also be machined. On the side facing the workpiece, the main part 18 has recesses. A removal of chips or lubricant during the rotation of an inserted tool can be ensured thereby. The surface of the main part 18 is embodied in a structured manner, in order to facilitate the mounting to a tool shank 14. The signaling device 38 in the form of an LED signal generator 39, which can output an alignment signal, is attached to the cover 20. The locking screws 44 serve to secure contact adjusting screws (not visible) for setting the sensibility of the switching point.

Figure 4:
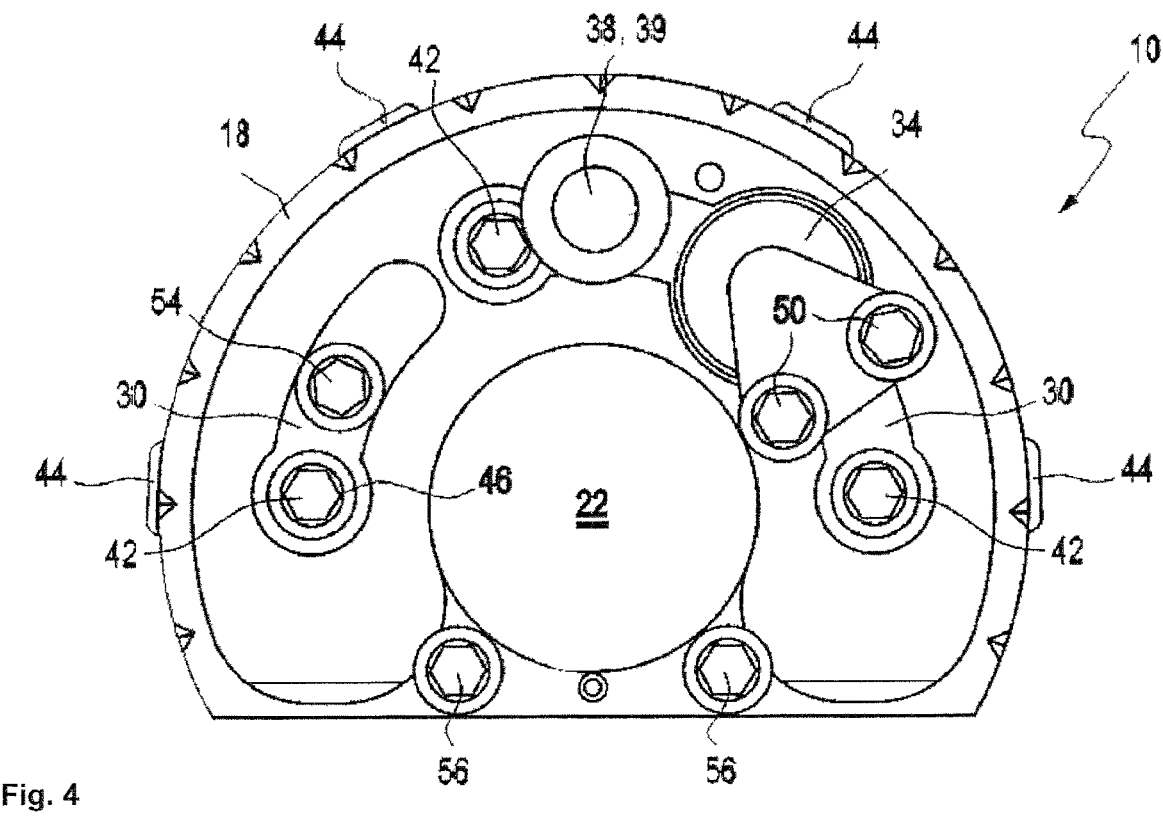
FIG. 4 shows a top view of an embodiment of a tool alignment device according to the invention according to FIG. 3 without cover of the main part.

FIG. 4 shows a top view without cover 20 of the main part 18 of the tool embodiment from FIG. 3. In addition, the securing screws 56 for the cover 20 as well as the signaling device 38 are illustrated in this top view. In the interior of the main part 18, the screw contact sheets 30 are visible in a top view, the screw heads of the contact adjusting screws 42 as well as the screw heads of the securing screws 54 of the screw contact sheets 30. The tool alignment device 10 has two separate screw contact sheets 30, wherein two contact adjusting screws 42 are attached in one screw contact sheet 30. The electrical current source 34, which is mounted by means of the securing screws 50, is likewise in contact with this screw contact sheet 30. The signaling device 38 is furthermore contacted by means of this screw contact sheet 30. Outside of the main part 18, the locking screws 44, which lock the contact adjusting screws 42 in a certain position, are visible in a side view. A through hole 22 for the guide-through of a guide sleeve or for the direct insertion of a tool is provided in the interior of the main part 18.

Figure 5:
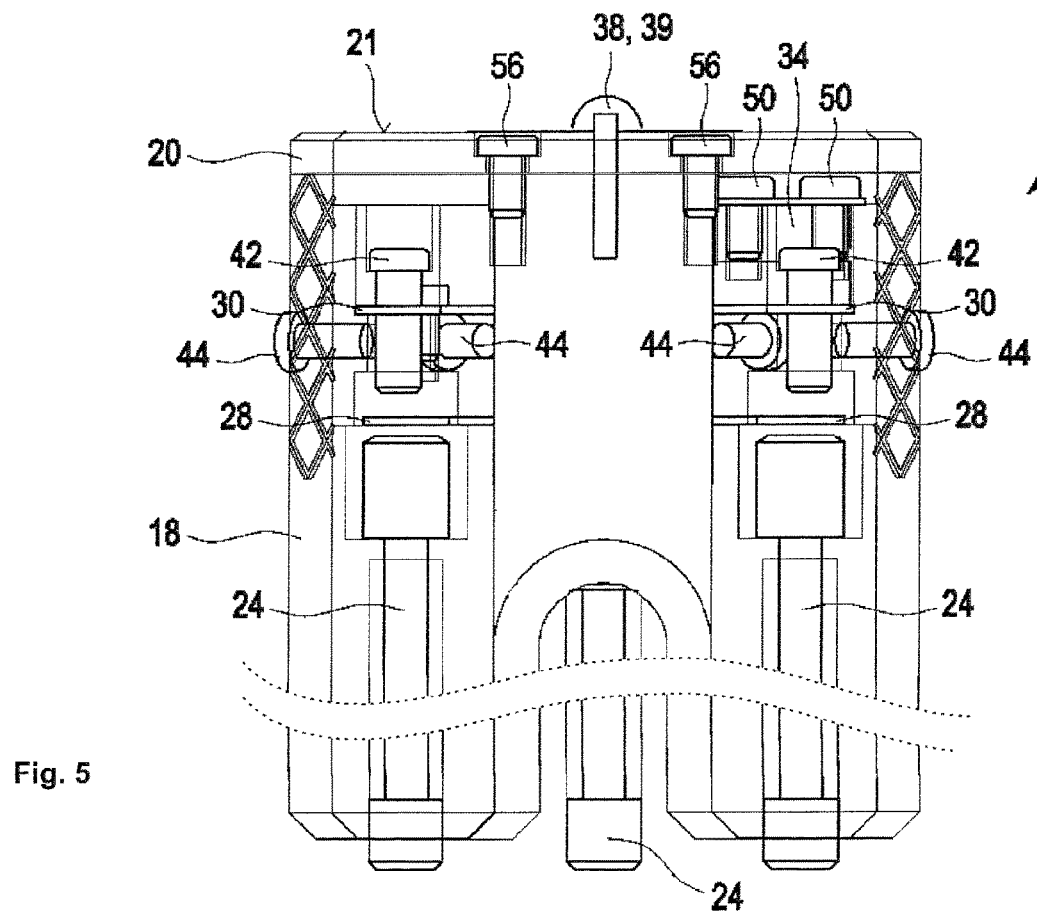
FIG. 5 shows a wireframe illustration of a side view of an embodiment according to FIG. 3.

FIG. 5 shows a wireframe illustration of an embodiment according to FIG. 3. A side view of the tool alignment device 10 from the side of the flattened main part 18, which forms the partial circle, is illustrated. The sensing elements 24 protrude the main part 18 on the underside, wherein the sensing elements 24 are supported so as to be displaceable in the vertical direction towards a workpiece surface, so that a contact between sensing elements 24, spring contact sheet 28, and contact adjusting screw 42 is possible. The spring contact sheets 28 are arranged so as to be offset parallel to the screw contact sheets 30, wherein the contact adjusting screws 42 are inserted through the screw contact sheets 30 or are screwed into them. The contact of the contact adjusting screws 42 to the spring contact sheets 28 takes place by means of a vertical displacement of the sensing elements 24, wherein the spring contact sheets 28 are pushed against the contact adjusting screws 42. The electric circuit is closed via the contact between workpiece (not illustrated), sensing elements 24, spring contact sheet 28, contact adjusting screw 42, and screw contact sheet 30. Based on this, the spring contact sheets 28 and screw contact sheets 30 are embodied in several pieces in order to form a switchable connection between the individual segment sections.

Figure 6:
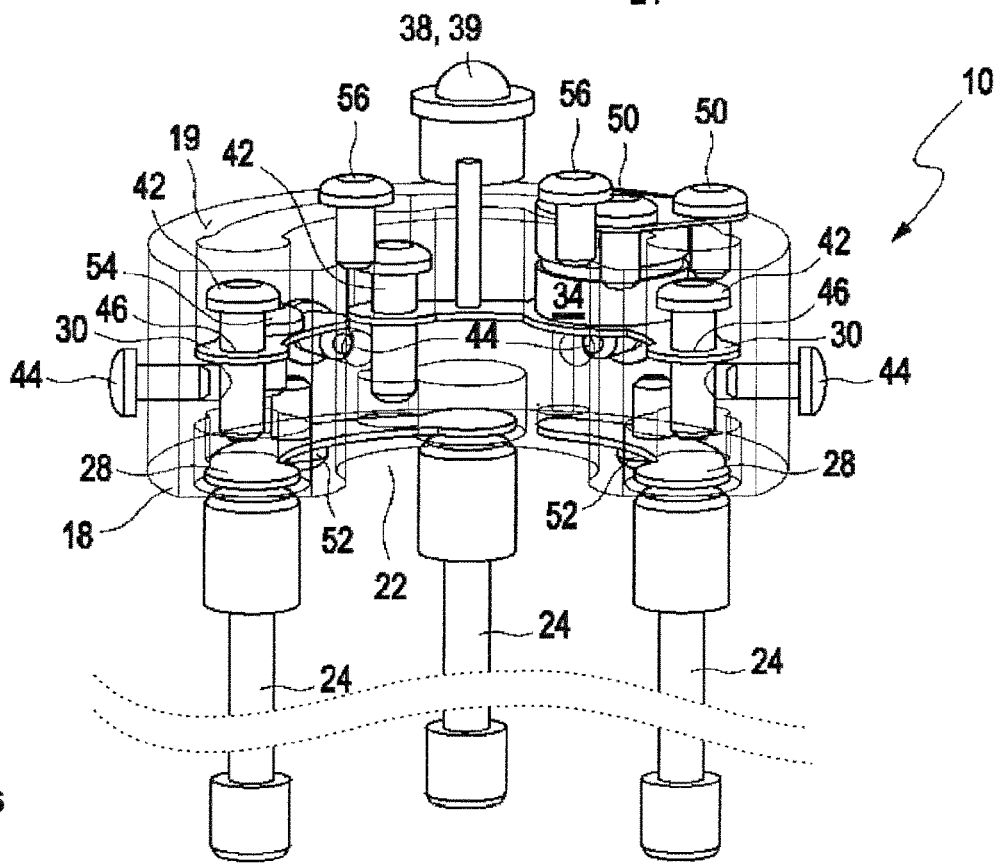
FIG. 6 shows a wireframe illustration of a longitudinal section of an embodiment as well as of a cross section through the main part according to FIG. 3.

A detailed illustration of the inner setup of the tool alignment device 10 is shown in FIG. 6. The contact adjusting screws 42 can be accessed from the top side via recesses in the interior of the main part 18, and can be inserted into the screw contact sheets 30 from there. From the outer side of the main part 18, the contact adjusting screws 42 can be secured in a desired vertical position by means of a corresponding locking screw 44 each, in order to specify an alignment direction in relation to the normal of a workpiece surface. If all switching points are identical, the machining is performed exactly in the normals. The sensibility of the tool alignment device 10, i.e. the switching point, at which the electric circuit 38 is closed, is determined via this vertical position. The tool alignment device 10 can thus be adapted for a certain pressing pressure of an operator. The central sensing element 24 is not arranged in a line of action with the corresponding contact adjusting screw 42, the two other sensing elements 24 lie in one plane with the corresponding contact adjusting screw 42. The signaling device 38 is conductively connected to a screw contact sheet 30. The securing screws 50 of the electrical current source 34 as well as the securing screws 56 of the cover (not illustrated) are shown in this view.

Figure 7:
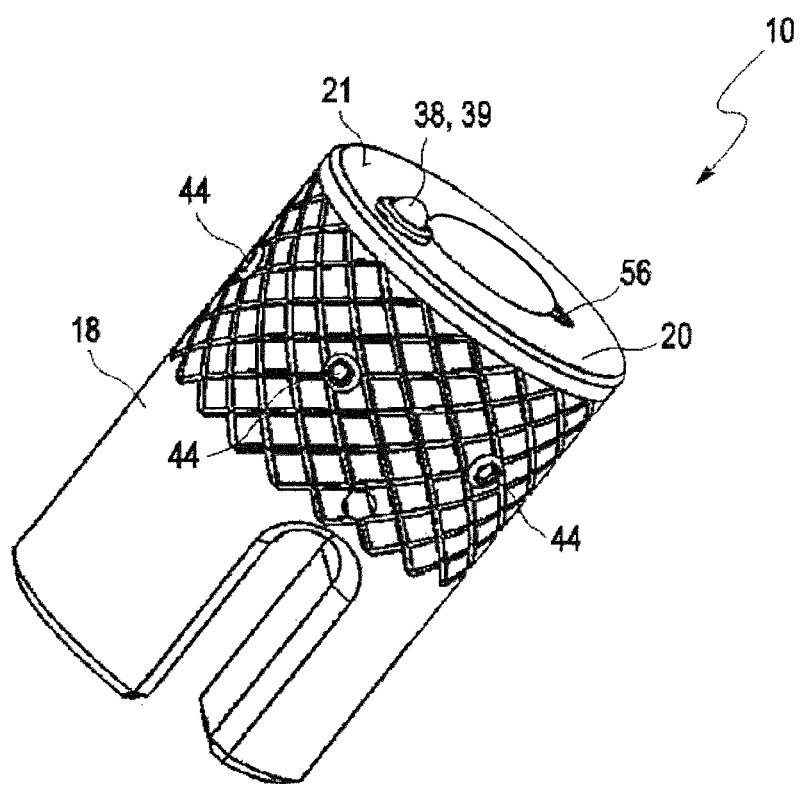
FIG. 7 shows an outer view of a further embodiment of a tool alignment device according to the invention.

FIG. 7 shows a further embodiment of a tool alignment device 10. The main part 18 has a circular cross section and is thus suitable for a machining of workpiece surfaces, which are not structurally limited. In the remaining embodiments, this illustration corresponds to the illustration from FIG. 3.

Figure 8:
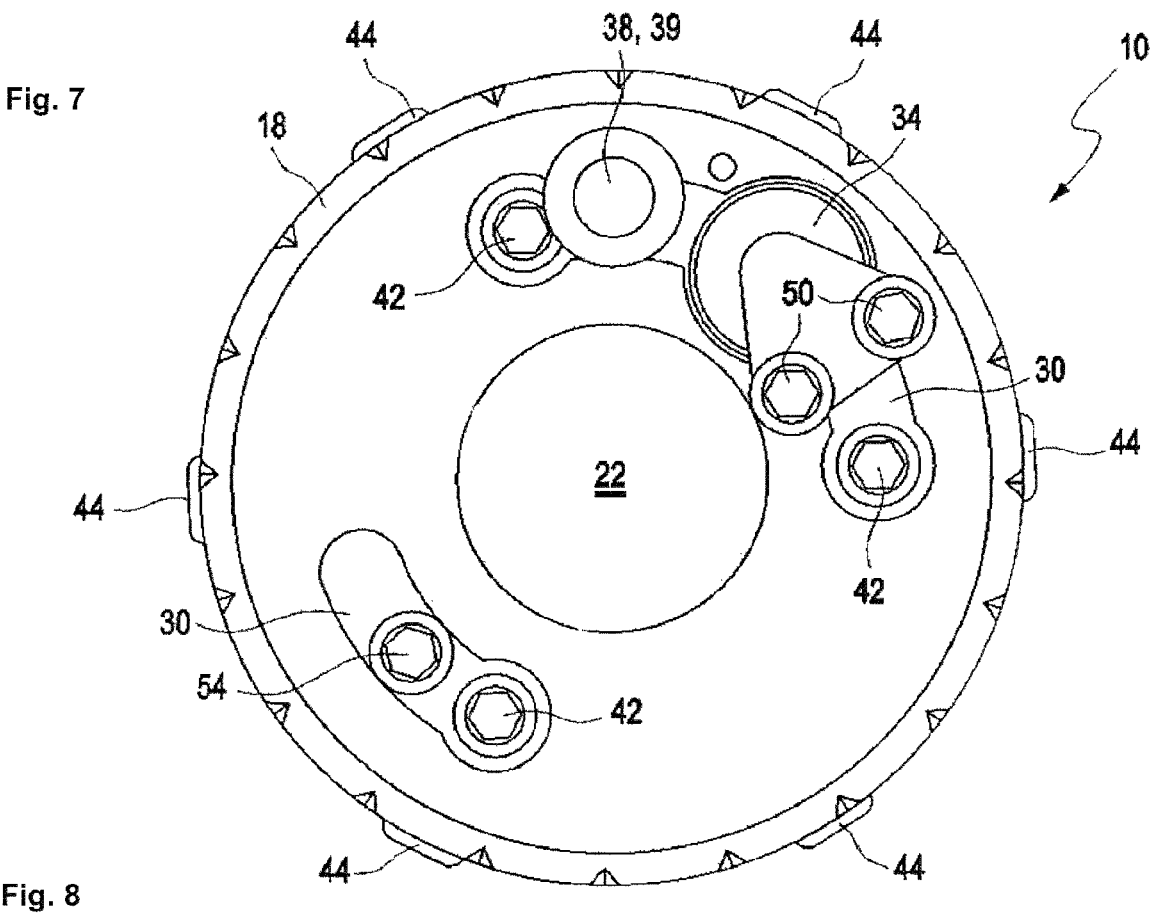
FIG. 8 shows a top view of an embodiment of a tool alignment device according to the invention according to FIG. 7 without coverage of the main part.

FIG. 8 illustrates a top view onto an embodiment from FIG. 7 without cover 20 of the main part 18. The main part 18 has a circular cross section, wherein the contact adjusting screws 42 are each arranged on a third of the circumference. The screw contact sheets 30 are visible in the illustration, the spring contact sheets 28 are arranged in a plane, which is offset in parallel, below the screw contact sheets 30, and are not illustrated in this view. A screw contact sheet 30 establishes a conductive connection between two contact adjusting screws 42, the electrical current source 34, and the signaling device 38. The electrical current source 34 is attached to the main part 18 via the securing screws 50. The further screw contact sheet 30 is attached to the main art 18 via a securing screw 54. The locking screws 44 serve the purpose of securing the contact adjusting screws 42 in a desired position.

Figure 9A:
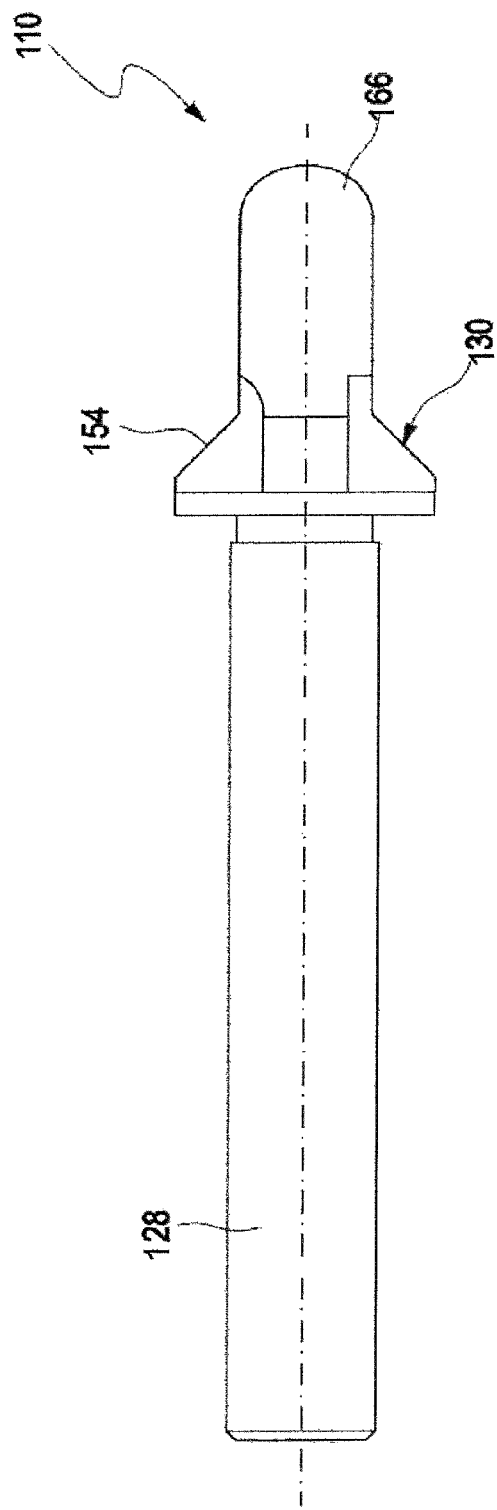
FIG. 9 shows a sectional illustration through an embodiment of a stop as well as illustration of a tool.

FIG. 9 shows an embodiment of a tool 110 comprising a stop 112, without illustration of the tool alignment device 10. The tool 110 illustrated in FIG. 9a is a countersinking tool and comprises a tool shank 128 and a tool head 130, which has a rounded insertion pin 166 and a plurality of deburring or countersinking cutting edges 154, respectively.

Figure 9B:
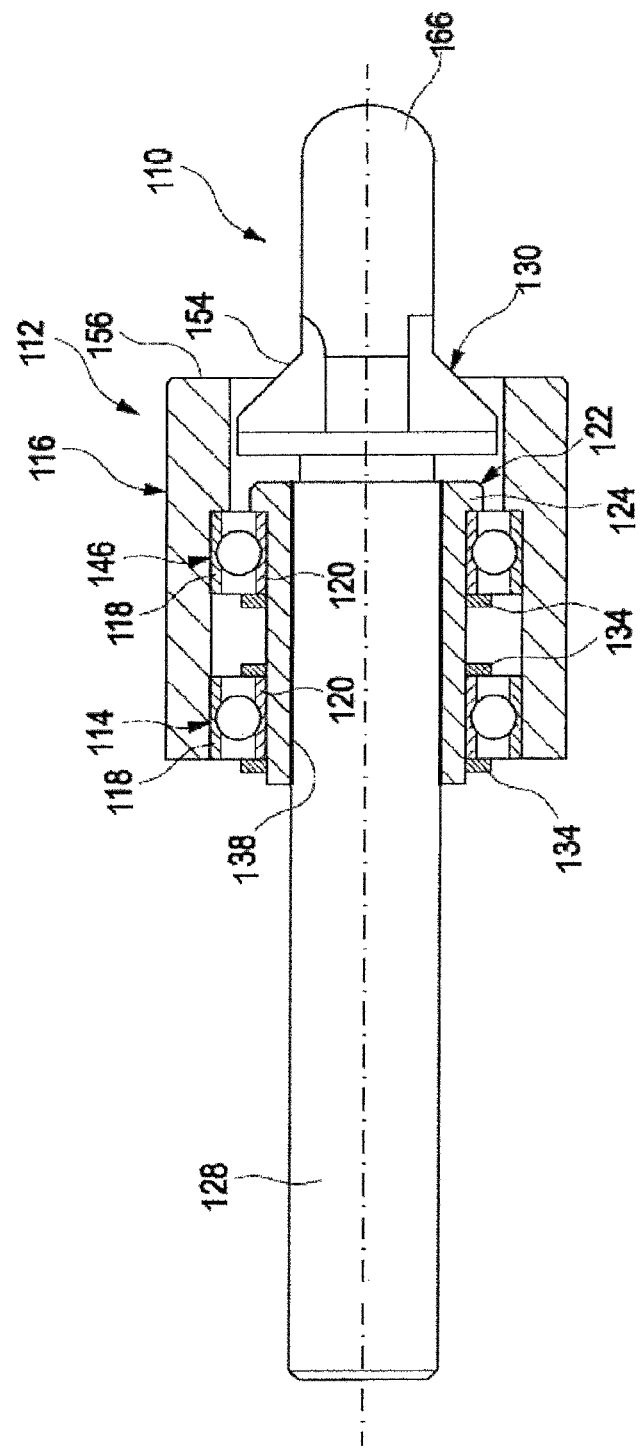

As illustrated in FIG. 9b, the stop 112 comprises a stop sleeve 116, which is supported so as to be rotatable freely about a shank sleeve 122 by means of two ball bearings 114, 146. The shank sleeve 122 can be slid axially onto the tool shank 128 all the way to the tool head 130, and can be connected in a rotationally fixed, non-positive manner to the shank 128 by means of an adhesive bond 138 at an axial point of the shank 128, which defines the stop depth. The first bearing bush 118 of the first and second ball bearing 114, 146 is adhered in the inner wall of the stop sleeve 116. The second bearing bush 120 of the first ball bearing is secured to the shank sleeve 122 by means of two bearing rings 134 and can nonetheless be adhered to the shank sleeve 122. The second bearing bush 120 of the second ball bearing 146 is locked by means of a counter bearing ring 124 of the shank sleeve 122 and a bearing ring 134. The stop sleeve 116 can rotate in relation to the shank sleeve 122 via the two ball bearings 114, 146. The shank sleeve is adhered to the shank 128 of the tool 110 in a non-positive manner, wherein the axial adhesive position defines the stop depth of the tool 110. The tool 110 illustrated in FIG. 9a, FIG. 9b is suitable for insertion into a tool alignment device according to one of the above-illustrated embodiments.

Figure 10A:
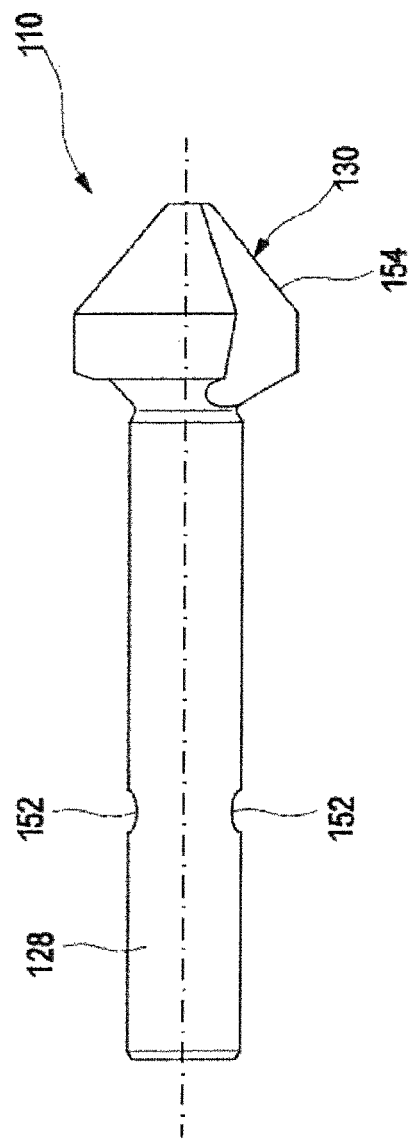
FIG. 10 shows a sectional illustration through an embodiment of a stop as well as illustration of a tool.
Figure 10B:
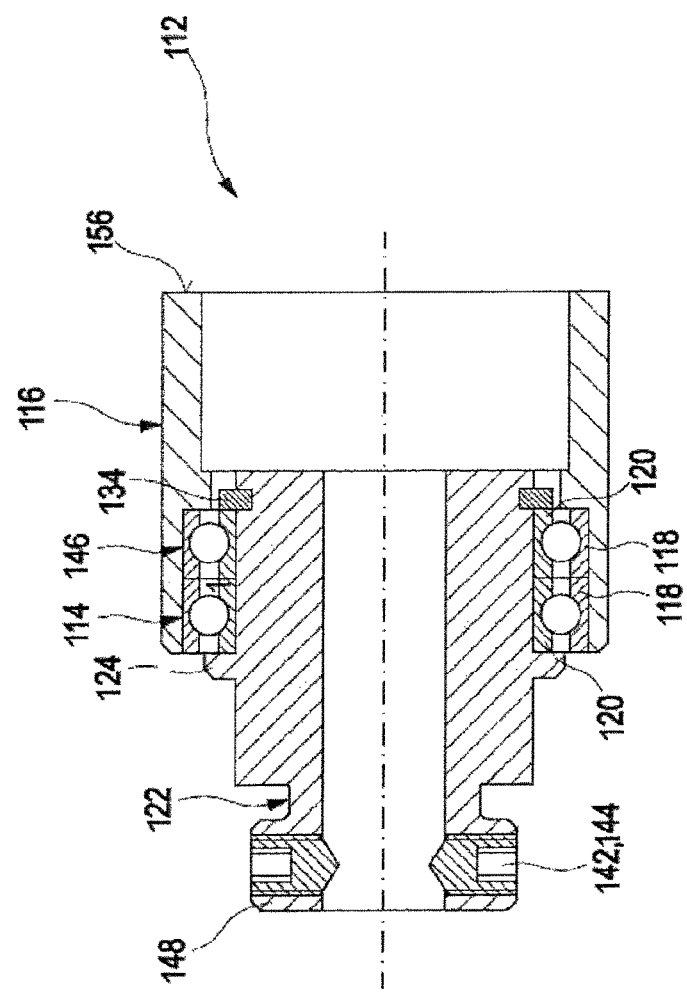

The stop 112 as well as a tool 110 in the form of a countersinking tool of a further exemplary embodiment is illustrated in FIGS. 10a and 10b in a side illustration. The stop 112 comprises a shank sleeve 122, which can be slid onto the shank 128 of the tool 110 and can be clamped in a rotationally fixed manner. The axial end region 148 of the stop 112, which lies in the direction of the drill shank 128 of the inserted tool 110, is radially enlarged and has radially aligned bores, with which clamping screws 144 engage as clamping means 142, in order to clamp the shank sleeve 122 in relation to the tool shank 128 of the tool 110. The clamping screws 142 serve for the rotationally fixed axial securing of the stop 112 on the shank 128 of the tool 110. The clamping position of the shank sleeve 122 on the shank 128 defines the stop depth. The stop sleeve 116 is supported so as to rotate freely on the shank sleeve 122 by means of two bearings 114 and 146. Each bearing 114, 146 has a first outer bearing bush 118 and a second inner bearing bush 120. On the shank sleeve 122, the inner bearing bush 120 is clamped between a counter bearing ring 124 and a bearing ring 134, while the outer bearing bush 118 is attached to the stop sleeve 116 by means of an adhesive. Either a sliding film or balls or cylinder rolling elements are arranged therebetween, in order to support the stop sleeve 116 so as to rotate freely in relation to the shank sleeve 122. The tool shank 128 of the tool 110 can be inserted into the shank sleeve 122, wherein the clamping screws 144 can be screwed into engagement depressions 152 of the drill shank 128, in order to lock the stop 112 in a rotationally fixed manner on the tool shank 128. The axial longitudinal position of the shank sleeve 122 on the tool shank 128 is specified by means of the engagement depressions 152, so that the stop depth is defined by the position of the engagement depressions 152. The engagement depressions 152 thus serve for a facilitated attachment, wherein a preset stop depth can be maintained when exchanging the tool 110.

No pins, grooves or webs, which can obviously be considered so as to be able to provide for a functional interaction with a guide device of an alignment device, are not illustrated in the outer circumference of the stops in the tools, which are illustrated in FIGS. 9 and 10, comprising stops.

REFERENCE LIST 10 tool alignment device
18 main part
19 top side of the main part
20 cover of the main part
21 top side of the cover
22 through hole
24 sensing elements
28 spring contact sheet
30 screw contact sheet
34 electrical current source
38 signaling device
39 LED signal generator
42 contact adjusting screw
44 locking screw
46 bore of the screw contact sheet
50 securing screw for battery 52 securing screw for first contact sheet
54 securing screw for second contact sheet
56 securing screw for cover of the main part
110 tool
112 stop
114 bearing
116 stop sleeve
118 first bearing bush
120 second bearing bush
122 shank sleeve
124 counter bearing ring
128 tool shank
130 tool head
134 bearing ring
138 adhesive bond
142 clamping means
144 clamping screws
146 second bearing
152 engagement depression
154 cutting edge
156 stop ring
166 tool head insertion pin
200 pin
201 web
202 groove
204 underside of the stop
206 guide device

The invention claimed is:

1. A tool alignment device for arrangement on a drilling and/or countersinking tool comprising a single-piece tool shank and a stop, for aligning a bore and/or countersink to be introduced or for aligning a finishing step in relation to a normal to the surface of a workpiece, comprising a main part and a through hole, wherein at least one signaling device is comprised, which is actuated upon mechanical contact of the tool alignment device with the surface of the workpiece and outputs at least one alignment signal during alignment in an alignment direction, and that the stop of the tool can be accommodated in the main part, wherein the main part comprises a guide device, which establishes a connection, between a stop sleeve of the stop and the tool alignment device, so that the stop can be aligned in the alignment direction, wherein:
   the stop is guided in the tool alignment device in a longitudinally displaceable manner, and is guided through the guide device, wherein the stop can be displaced in the main part in a longitudinally axial manner in the direction of the workpiece,
   the guide device comprises at least one pin, one web and/or one groove, and
   the web or the groove runs across the complete length of the tool alignment device of the stop, so that the stop can be displaced in such a way that an underside of the stop can come into mechanical contact with the surface of the workpiece.

2. The tool alignment device according to claim 1, wherein the stop can be connected to the tool alignment device in a rotationally fixed manner.

3. The tool alignment device according to claim 1, wherein the tool alignment device comprises at least two mechanical or electrical sensing elements for bearing on the surface of the workpiece.

4. The tool alignment device according to claim 3, wherein the axial sensing position of the sensing elements can be adjusted for setting the alignment direction.

5. The tool alignment device according to claim 4, wherein an electrical switching point of at least one electrical sensing element is positionally adjustable in the bearing direction towards the surface of the workpiece, and can be screwed or displaced relative to the surface of the workpiece by means of a first contact adjusting screw, so that the alignment device can be set in relation to the normal of a surface of a workpiece.

6. The tool alignment device according to claim 5, wherein at least the first contact adjusting screw or at least a second contact adjusting screw can be positionally secured via a locking screw.

7. The tool alignment device according to claim 3, wherein all sensing elements close an electric circuit between an electrical current source comprised in the main part and the signaling device by means of a series connection actuated by the sensing elements by means of an alignment movement of the tool alignment device in relation to the normal of the surface of the workpiece, so as to actuate the individual signaling device by means of the closed electric circuit.

8. The tool alignment device according to claim 7, wherein the at least two sensing elements have the same length L and/or that the main part is embodied circular cylindrically or partially circular cylindrically, and/or that the signaling device is arranged on the top side of the main part and is embodied as optical, haptic, and/or as acoustic signal generator.

9. The tool alignment device according to claim 3, wherein at least one spring contact sheet, which can be mechanically contacted by means of at least one electrical sensing element, can be electrically contacted via the contact adjusting screw with a screw contact sheet, wherein the contact adjusting screw can be accessed and set from the top side of the main part and is arranged in the main part in the alignment direction.

10. The tool alignment device according to claim 9, wherein the at least one spring contact sheet is arranged parallel to the screw contact sheet in the main part, wherein the screw contact sheet can be electrically contacted with the spring contact sheet via at least one contact adjusting screw by means of a spring movement, which is triggered by the sensing element.

11. The tool alignment device according to claim 9, wherein the screw contact sheet has bores, into which the contact adjusting screw can be inserted, soldered or screwed, whereby a permanently-guiding connection is established between the screw contact sheet and the contact adjusting screw.

12. The tool alignment device according to claim 3, wherein the tool alignment device comprises at least three mechanical or electrical sensing elements for bearing on the surface of the workpiece.

13. The tool alignment device according to claim 3, wherein the sensing elements are arranged so as to be distributed evenly circumferentially on the workpiece-side front side of the main part.

14. The tool alignment device according to claim 3, wherein at least one spring contact sheet, which can be mechanically contacted by means of at least one electrical sensing element, can be electrically contacted via the contact adjusting screw with a screw contact sheet, wherein at least two contact adjusting screws can be electrically connected via a joint spring contact sheet, and at least two contact adjusting screws are electrically connected to one another via a first screw contact sheet.

15. The tool alignment device according to claim 14, wherein an electrical current source and/or the signaling device is in electrical contact with (i) at least one spring contact sheet and/or (ii) at least the first screw contact sheet or at least a second screw contact sheet.

16. A drilling, milling and/or countersinking tool comprising a stop, wherein the stop is accommodated in a tool alignment device according to claim 1.

17. The drilling, milling and/or countersinking tool comprising a stop according to claim 16, wherein the stop is clamped, screwed or adhered to the tool shank of a deburring tool.

18. The tool alignment device according to claim 1, wherein the web and/or the groove runs in the longitudinal direction, and can accordingly be guided in a longitudinally axial manner in a groove or a pin or web of the stop sleeve, so that a rotationally fixed connection between the tool alignment device and the stop, and an axial displaceability of the stop is provided in the tool alignment device.

19. The tool alignment device according to claim 1, wherein the web and/or the groove runs in the longitudinal direction parallel to the longitudinal axis of the tool alignment device, and can accordingly be guided in a longitudinally axial manner in a groove or a pin or web of the stop sleeve, so that a rotationally fixed connection between the tool alignment device and the stop, and an axial displaceability of the stop is provided in the tool alignment device.

20. A tool alignment device for arrangement on a drilling and/or countersinking tool comprising a single-piece tool shank and a stop, for aligning a bore and/or countersink to be introduced or for aligning a finishing step in relation to a normal to the surface of a workpiece, comprising a main part and a through hole, wherein at least one signaling device is comprised, which is actuated upon mechanical contact of the tool alignment device with the surface of the workpiece and outputs at least one alignment signal during alignment in an alignment direction, and that the stop of the tool can be accommodated in the main part, wherein the main part comprises a guide device, which establishes a connection, between a stop sleeve of the stop and the tool alignment device, that prevents the stop sleeve from rotating, relative to the tool alignment device, about an axis of the tool shank, so that the stop can be aligned in the alignment direction.

21. The tool alignment device according to claim 20, wherein the stop can be connected to the tool alignment device in a rotationally fixed manner.

22. The tool alignment device according to claim 20, wherein the guide device comprises at least one pin, one web and/or one groove.

23. The tool alignment device according to claim 22, wherein the web or the groove runs across the complete length of the tool alignment device of the stop, so that the stop can be displaced in such a way that an underside of the stop can come into mechanical contact with the surface of the workpiece.

24. The tool alignment device according to claim 22, wherein the web and/or the groove runs in the longitudinal direction, and can accordingly be guided in a longitudinally axial manner in a groove or a pin or web of the stop sleeve, so that a rotationally fixed connection between the tool alignment device and the stop, and an axial displaceability of the stop is provided in the tool alignment device.

25. The tool alignment device according to claim 22, wherein the web and/or the groove runs in the longitudinal direction parallel to the longitudinal axis of the tool alignment device, and can accordingly be guided in a longitudinally axial manner in a groove or a pin or web of the stop sleeve, so that a rotationally fixed connection between the tool alignment device and the stop, and an axial displaceability of the stop is provided in the tool alignment device.

26. The tool alignment device according to claim 20, wherein the tool alignment device comprises at least two mechanical or electrical sensing elements for bearing on the surface of the workpiece.

27. The tool alignment device according to claim 26, wherein the axial sensing position of the sensing elements can be adjusted for setting the alignment direction.

28. The tool alignment device according to claim 27, wherein an electrical switching point of at least one electrical sensing element is positionally adjustable in the bearing direction towards the surface of the workpiece, and can be screwed or displaced relative to the surface of the workpiece by means of a first contact adjusting screw, so that the alignment device can be set in relation to the normal of a surface of a workpiece.

29. The tool alignment device according to claim 28, wherein at least the first contact adjusting screw or at least a second contact adjusting screw can be positionally secured via a locking screw.

30. The tool alignment device according to claim 26, wherein all sensing elements close an electric circuit between an electrical current source comprised in the main part and the signaling device by means of a series connection actuated by the sensing elements by means of an alignment movement of the tool alignment device in relation to the normal of the surface of the workpiece, so as to actuate the individual signaling device by means of the closed electric circuit.

31. The tool alignment device according to claim 30, wherein the at least two sensing elements have the same length L and/or that the main part is embodied circular cylindrically or partially circular cylindrically, and/or that the signaling device is arranged on the top side of the main part and is embodied as optical, haptic, and/or as acoustic signal generator.

32. The tool alignment device according to claim 26, wherein at least one spring contact sheet, which can be mechanically contacted by means of at least one electrical sensing element, can be electrically contacted via the contact adjusting screw with a screw contact sheet, wherein the contact adjusting screw can be accessed and set from the top side of the main part and is arranged in the main part in the alignment direction.

33. The tool alignment device according to claim 32, wherein the at least one spring contact sheet is arranged parallel to the screw contact sheet in the main part, wherein the screw contact sheet can be electrically contacted with the spring contact sheet via at least one contact adjusting screw by means of a spring movement, which is triggered by the sensing element.

34. The tool alignment device according to claim 32, wherein an electrical current source and/or the signaling device is in electrical contact with (i) at least one spring contact sheet and/or (ii) at least the first screw contact sheet or at least a second contact sheet.

35. The tool alignment device according to claim 32, wherein the screw contact sheet has bores, into which the contact adjusting screw can be inserted, soldered or screwed, whereby a permanently-guiding connection is established between the screw contact sheet and the contact adjusting screw.

36. A drilling, milling and/or countersinking tool comprising a stop, wherein the stop is accommodated in a tool alignment device according to claim 20.

37. A tool alignment device for arrangement on a drilling and/or countersinking tool comprising a single-piece tool shank and a stop, for aligning a bore and/or countersink to be introduced or for aligning a finishing step in relation to a normal to a surface of a workpiece, comprising a main part and a through hole, wherein:

at least one signaling device is comprised, which is actuated upon mechanical contact of the tool alignment device with the surface of the workpiece and outputs at least one alignment signal during alignment in an alignment direction, and the stop of the tool can be accommodated in the main part, the main part comprises a guide device, which establishes a connection, between a stop sleeve of the stop and the tool alignment device, so that the stop can be aligned in the alignment direction, the stop is guided in the tool alignment device in a longitudinally displaceable manner, and is guided through the guide device, the stop can be displaced in the main part in a longitudinally axial manner in the direction of the workpiece, the guide device comprises at least one pin, one web and/or one groove, and the web and/or the groove runs in a longitudinal direction, and can accordingly be guided in a longitudinally axial manner in a groove or a pin or web of the stop sleeve, so that a rotationally fixed connection between the tool alignment device and the stop, and an axial displaceability of the stop is provided in the tool alignment device.

38. A tool alignment device for arrangement on a drilling and/or countersinking tool comprising a single-piece tool shank and a stop, for aligning a bore and/or countersink to be introduced or for aligning a finishing step in relation to a normal to a surface of a workpiece, comprising a main part and a through hole, wherein:

at least one signaling device is comprised, which is actuated upon mechanical contact of the tool alignment device with the surface of the workpiece and outputs at least one alignment signal during alignment in an alignment direction, and the stop of the tool can be accommodated in the main part, the main part comprises a guide device, which establishes a connection, between a stop sleeve of the stop and the tool alignment device, so that the stop can be aligned in the alignment direction, the stop is guided in the tool alignment device in a longitudinally displaceable manner, and is guided through the guide device, the stop can be displaced in the main part in a longitudinally axial manner in the direction of the workpiece, the guide device comprises at least one pin, one web and/or one groove, and the web and/or the groove runs in a longitudinal direction parallel to the longitudinal axis of the tool alignment device, and can accordingly be guided in a longitudinally axial manner in a groove or a pin or web of the stop sleeve, so that a rotationally fixed connection between the tool alignment device and the stop, and an axial displaceability of the stop is provided in the tool alignment device.

39. A tool alignment device for arrangement on a drilling and/or countersinking tool comprising a single-piece tool shank and a stop, for aligning a bore and/or countersink to be introduced or for aligning a finishing step in relation to a normal to a surface of a workpiece, comprising a main part and a through hole, wherein:

at least one signaling device is comprised, which is actuated upon mechanical contact of the tool alignment device with the surface of the workpiece and outputs at least one alignment signal during alignment in an alignment direction, and the stop of the tool can be accommodated in the main part, the main part comprises a guide device, which establishes a connection, between a stop sleeve of the stop and the tool alignment device, so that the stop can be aligned in the alignment direction, the stop is guided in the tool alignment device in a longitudinally displaceable manner, and is guided through the guide device, the stop can be displaced in the main part in a longitudinally axial manner in the direction of the workpiece, the guide device comprises at least one pin, one web and/or one groove, the tool alignment device comprises at least two mechanical or electrical sensing elements for bearing on the surface of the workpiece, at least one spring contact sheet, which can be mechanically contacted by means of at least one electrical sensing element, can be electrically contacted via the contact adjusting screw with a screw contact sheet, and the contact adjusting screw can be accessed and set from the top side of the main part and is arranged in the main part in the alignment direction.

40. A tool alignment device for arrangement on a drilling and/or countersinking tool comprising a single-piece tool shank and a stop, for aligning a bore and/or countersink to be introduced or for aligning a finishing step in relation to a normal to a surface of a workpiece, comprising a main part and a through hole, wherein:

at least one signaling device is comprised, which is actuated upon mechanical contact of the tool alignment device with the surface of the workpiece and outputs at least one alignment signal during alignment in an alignment direction, and the stop of the tool can be accommodated in the main part, the main part comprises a guide device, which establishes a connection, between a stop sleeve of the stop and the tool alignment device, so that the stop can be aligned in the alignment direction, the stop is guided in the tool alignment device in a longitudinally displaceable manner, and is guided through the guide device, the stop can be displaced in the main part in a longitudinally axial manner in the direction of the workpiece, the guide device comprises at least one pin, one web and/or one groove, the tool alignment device comprises at least two mechanical or electrical sensing elements for bearing on the surface of the workpiece, at least one spring contact sheet, which can be mechanically contacted by means of at least one electrical sensing element, can be electrically contacted via the contact adjusting screw with a screw contact sheet, and at least two contact adjusting screws can be electrically connected via a joint spring contact sheet, and at least two contact adjusting screws are electrically connected to one another via a screw contact sheet.

* * * * *